United States Patent
Shibamoto (10) Patent No.: US 10,798,181 B2
(45) Date of Patent: Oct. 6, 2020

(54) STORAGE MEDIUM CONTAINING A PROGRAM, INFORMATION PROCESSING DEVICE, AND PROCESSING METHOD FOR DEPLOYING AN APPLICATION GENERATED TO A CLOUD ENVIRONMENT

(71) Applicants: CANON MARKETING JAPAN KABUSHIKI KAISHA, Tokyo (JP); CANON IT SOLUTIONS KABUSHIKI KAISHA, Tokyo (JP)

(72) Inventor: Fumihiro Shibamoto, Tokyo (JP)

(73) Assignees: CANON MARKETING JAPAN KABUSHIKI KAISHA, Tokyo (JP); CANON IT SOLUTIONS KABUSHIKI KAISHA, Tokyo (JP)

(*) Notice: Subject to any disclaimer, the term of this patent is extended or adjusted under 35 U.S.C. 154(b) by 19 days.

(21) Appl. No.: 16/184,589

(22) Filed: Nov. 8, 2018

(65) Prior Publication Data

US 2019/0149614 A1 May 16, 2019

(30) Foreign Application Priority Data

Nov. 13, 2017 (JP) .................................. 2017/218003
Sep. 18, 2018 (JP) .................................. 2018-173189

(51) Int. Cl.
  *G06F 13/00* (2006.01)
  *H04L 29/08* (2006.01)
  *H04L 29/06* (2006.01)

(52) U.S. Cl.
  CPC ............ *H04L 67/141* (2013.01); *H04L 67/10* (2013.01); *H04L 67/1097* (2013.01); *H04L 67/42* (2013.01)

(58) Field of Classification Search
  CPC ..... G06F 8/30; G06F 8/31; G06F 8/61; G06F 8/65; G06F 8/67; G06F 8/68; G06F 8/71;
  (Continued)

(56) References Cited

U.S. PATENT DOCUMENTS

| | | | |
|---|---|---|---|
| 2005/0165906 A1* | 7/2005 | Deo .................... | H04L 41/5054 709/217 |
| 2011/0078675 A1* | 3/2011 | Van Camp ................ | G06F 8/65 717/170 |
| 2016/0026452 A1* | 1/2016 | Dani ......................... | G06F 8/65 717/170 |

FOREIGN PATENT DOCUMENTS

JP  2016-170785 A  9/2016

* cited by examiner

*Primary Examiner* — Robert B Harrell
(74) *Attorney, Agent, or Firm* — Canon U.S.A., Inc. IP Division

(57) ABSTRACT

To provide a system for easily deploying a generated application in a cloud environment, a non-transitory computer-readable storage medium contains a program, which is executable by a device to generate an application, the program causing the information processing device to function as: a first module to acquire definition information for generating the application; a second module to generate the application based on the definition information acquired by the second module; a third module to acquire connection information to be used for connecting to a cloud environment; a fourth module to acquire history information on the application; and a fifth module to connect to the cloud environment by using the connection information acquired by the third module, and deploy the application generated by the second module in the cloud environment based on the history information on the application acquired by the fourth module.

9 Claims, 11 Drawing Sheets

(58) Field of Classification Search
CPC . G06F 8/423; G06F 9/44; G06F 9/445; G06F 9/4425; G06F 9/4428; G06F 13/00; H04L 29/06; H04L 29/08; H04L 29/0809; H04L 29/06095; H04L 29/08072; H04L 29/08576; H04L 67/10; H04L 67/42; H04L 67/141; H04L 67/1097
USPC .......................................... 709/227; 717/114
See application file for complete search history.

CLOUD INFORMATION SCREEN  800

CLOUD INFORMATION SCREEN

| | | | | | | | | |
|---|---|---|---|---|---|---|---|---|
| | | | | 801 — REFRESH | | 802 — MONITORING CONNECTION INFORMATION | | |
| APPLICATION NAME | ENVIRONMENT NAME | URL | STATE | HEALTH | VERSION LABEL | CREATION DATE AND TIME | UPDATE DATE AND TIME | |
| AP1 | ENV_HONBAN | http://AP1.xxx/... | Ready | Green | V1.2.0 | 2017/10/1 4:00 | 2017/11/1 4:00 | 803 |
| AP1 | ENV_DEMO | http://AP1-demo.xxx/... | Ready | Green | V1.2.0 | 2017/9/10 12:00 | 2017/10/10 12:00 | 804 |
| AP1 | ENV_STG | http://AP1-stg.xxx/... | Ready | Red | V1.2.0 | 2017/8/10 12:00 | 2017/10/10 12:00 | 805 |
| AP1 | ENV_DEV | http://AP1-dev.xxx/... | Ready | Green | V1.2.1 | 2017/7/15 15:00 | 2017/11/10 14:10 | 806 |

CLOSE

STORAGE MEDIUM CONTAINING A PROGRAM, INFORMATION PROCESSING DEVICE, AND PROCESSING METHOD FOR DEPLOYING AN APPLICATION GENERATED TO A CLOUD ENVIRONMENT

BACKGROUND OF THE INVENTION

Field of the Invention

The present invention relates to a storage medium, information processing device, and processing method for generating an application.

Description of the Related Art

Hitherto, there has been known a tool or service for generating a web application based on a set definition. Further, in recent years, a cloud technology has generally been used, and an increasing number of companies are using a cloud service without owning servers.

Thus, those companies are considered to deploy a web application generated by the tool or service in a cloud environment.

In Japanese Patent Application Laid-Open No. 2016-170785, there is described a system for generating an application by using an application generation tool.

However, in Japanese Patent Application Laid-Open No. 2016-170785, there is not described deployment of an application generated by an application generation tool in the cloud environment.

That is, in order to deploy an application generated by an application generation tool in the cloud environment, another separate tool, browser, or software for connecting to the cloud environment is required to be used to input connection information (e.g., authentication information) for connecting to the cloud environment and information (e.g., application name or version) on an application to be deployed, and then, the generated application is required to be specified to be uploaded. The above-mentioned procedure is required to be performed every time an application is generated, resulting in a problem in that it takes time and effort to generate and deploy an application.

In view of the above, the present invention has an object to provide a system for easily deploying a generated application in a cloud environment.

SUMMARY OF THE INVENTION

According to one embodiment of the present invention, there is provided a non-transitory computer-readable storage medium containing program which is executable by an information processing device configured to generate an application, the program causing the information processing device to function as: a definition information acquisition module configured to acquire definition information for generating the application; a generation module configured to generate the application based on the definition information acquired by the definition information acquisition module; a connection information acquisition module configured to acquire connection information to be used for connecting to a cloud environment; a history information acquisition module configured to acquire history information on the application; and a deployment module configured to connect to the cloud environment by using the connection information acquired by the connection information acquisition module, and deploy the application generated by the generation module in the cloud environment based on the history information on the application acquired by the history information acquisition module.

According to one embodiment of the present invention, the system for easily deploying a generated application in the cloud environment can be provided.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

Figure 1:
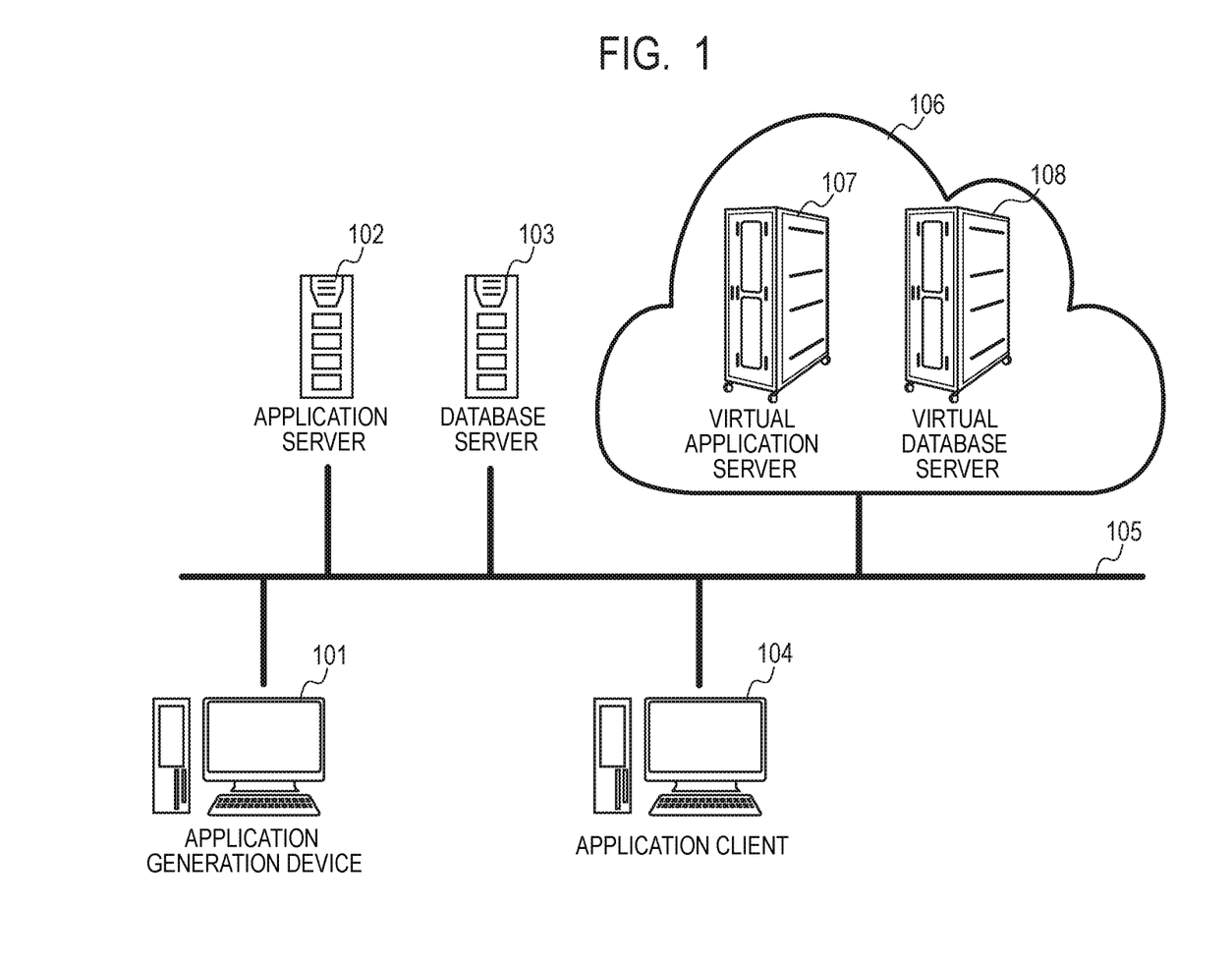
FIG. 1 is an exemplary configuration diagram for illustrating a system in one embodiment of the present invention.

FIG. 1 is an exemplary configuration diagram for illustrating a system in one embodiment of the present invention.

An application generation device 101 defines, for example, a screen layout and a database search instruction in accordance with an operation by a developer. The application generation device 101 generates a program and an application.

In this embodiment, an application to be generated by the application generation device 101 is a web application. However, the application to be generated is not limited thereto. The application to be generated may be, for example, an application or embedded software to be operated by an information processing device such as a cell phone, a smartphone, or a tablet computer, and may not be an application utilizing communication by a web technology.

An application server 102 executes an application generated and deployed by the application generation device 101. Further, the application server 102 can connect to a database server 103 to operate data of a database.

The database server 103 is a database to be used by a generated application. The database server 103 may also be used for, for example, operation check at the time of development. Further, the database server 103 may be configured by the same device as the application generation device 101 or the application server 102, or may be deployed in a network 105, for example, a LAN.

An application client 104 is an operation terminal of an end user, which causes an application program developed by the application generation device 101 to be operated in cooperation with the application server 102. This application client 104 is an information processing device, for example, a mobile terminal.

A client environment 106 is a dynamically scalable environment capable of supplying a virtualized resource.

The virtual application server 107 in the client environment 106 executes an application generated and deployed by the application generation device 101. Further, the virtual application server 107 can connect to the virtual database server 108 to operate data of a database.

The virtual database server 108 in the client environment 106 is a database to be used by a generated application. The database may also be used for, for example, operation check at the time of development.

The client environment 106 is set to be a dynamically scalable environment capable of supplying a virtualized resource. However, in this embodiment, the client environment 106 is not required to have this feature, and the client environment 106 may not be a dynamically scalable environment nor be capable of supplying a virtualized resource as long as the client environment 106 provides operations of the virtual application server 107 and the virtual database server 108.

Figure 2:
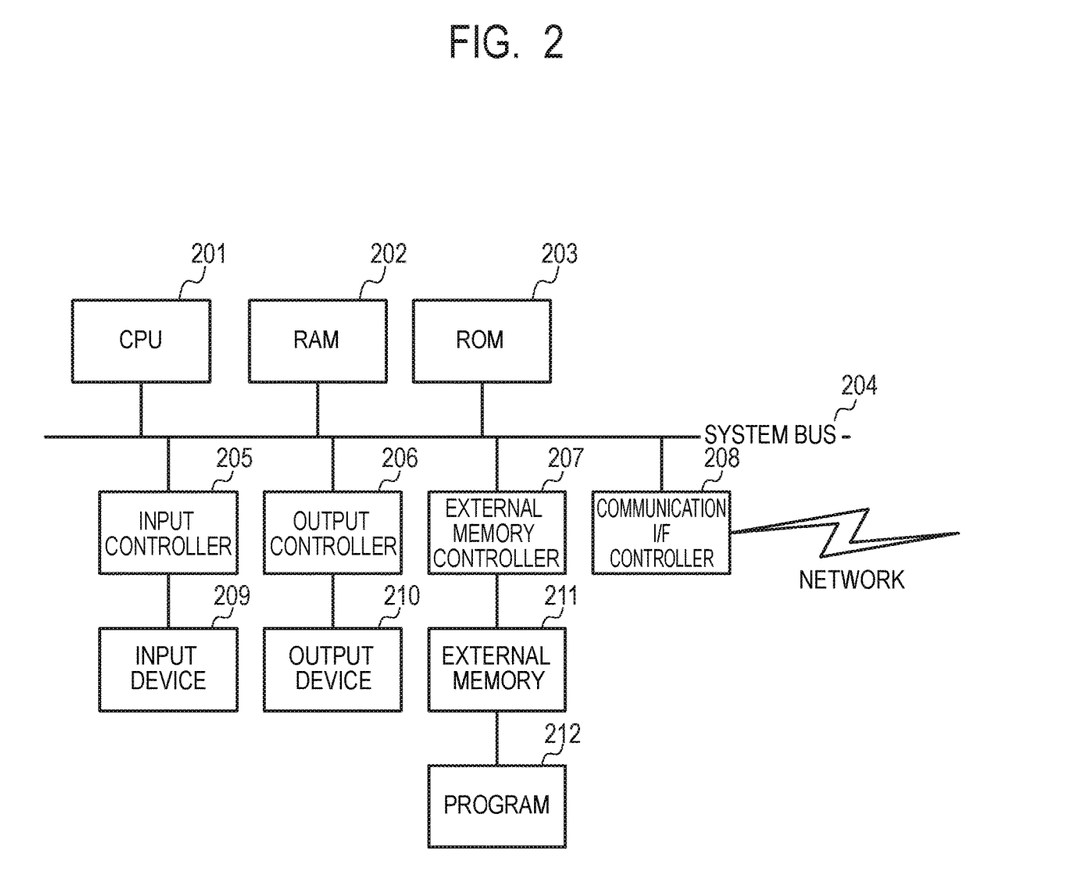
FIG. 2 is an exemplary block diagram for illustrating each hardware configuration that can be applied as an application generation device, an application server, a database server, a virtual application server, a virtual database server, and an application client.

FIG. 2 is an exemplary block diagram for illustrating each hardware configuration that can be applied as the application generation device 101, the application server 102, the database server 103, and the application client 104 in one embodiment of the present invention.

In FIG. 2, a CPU 201 integrally controls each device connected to a system bus 204.

Further, a ROM 203 or an external memory 211 stores an operating system (OS), which is a program for controlling the CPU 201, or a program for implementing various functions to be described later of the information processing device, such as each server, a client, and a device.

A RAM 202 functions as, for example, a main memory, a work area, and a temporary evacuation area of the CPU 201.

An input controller 205 controls input from an input device 209. The information processing device serving as the input device 209 includes a keyboard, a pointing device, for example, a mouse, and a touch panel.

When the input device 209 is a touch panel, the user can give various instructions by pressing (e.g., touching by finger) an icon, cursor, or button displayed on the touch panel.

Further, the touch panel may be a touch panel capable of detecting positions touched by a plurality of fingers, for example, a multi-touch screen.

An output controller 206 controls display of an output device 210. Examples of the output device 210 include a CRT or a liquid display. The output device 210 may be a display of a laptop computer integral with its main body. Further, the output device 210 may be a projector.

An external memory controller 207 controls access to the external memory 211 storing, for example, a boot program, various kinds of applications, font data, a user file, an edited file, or a printer driver. The external memory 211 stores various tables and parameters for implementing various kinds of functions of each server, a client, and a device.

Examples of the external memory 211 include a hard disk (HD), a flexible disk (FD), a compact flash (trademark) connected to a PCMCIA card plot via an adapter, or smart media.

The CPU 201 can execute, for example, processing of expressing information in outline font (rasterizing) in an information display region of the RAM 202 for display on the output device 210. Further, the CPU 201 enables the user to give an instruction with, for example, a mouse cursor (not shown) on the output device 210.

A communication I/F controller 208 executes processing of controlling communication to/from an external device via a network. For example, the communication I/F controller 208 can execute communication via TCP/IP.

A program 212 for implementing the present invention is stored in the external memory 211, and is loaded into the RAM 202 as required for execution by the CPU 201.

Figure 3:
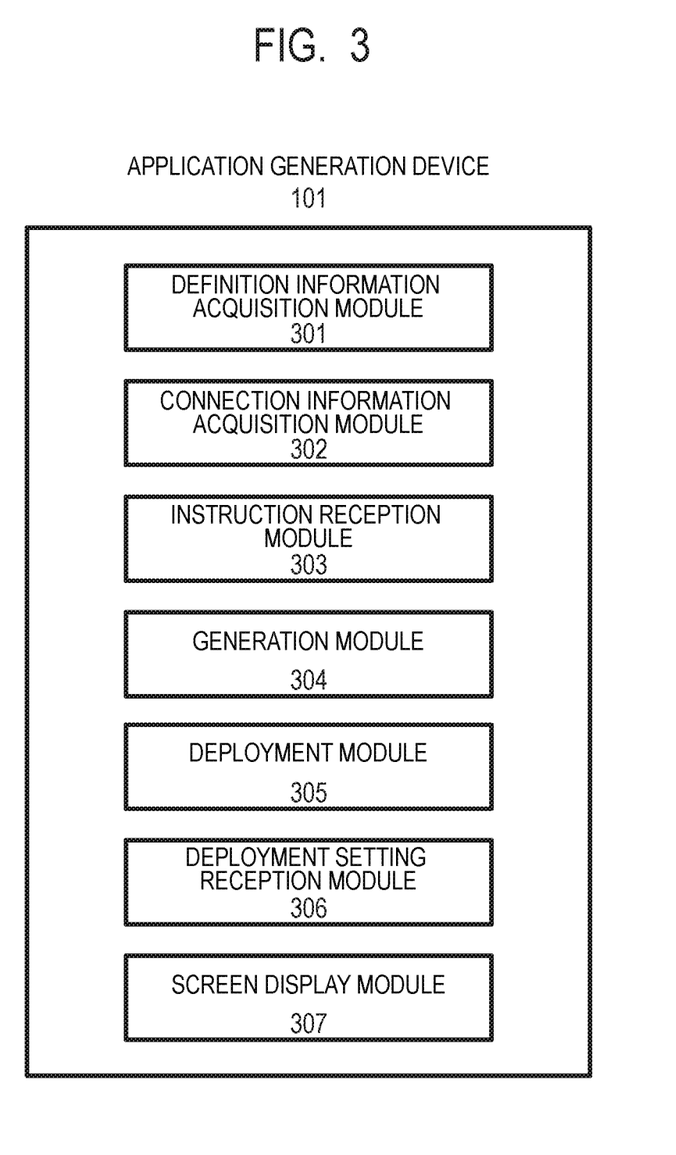
FIG. 3 is an exemplary block diagram for illustrating a software configuration.

FIG. 3 is an exemplary block diagram for illustrating a software configuration in one embodiment of the present invention.

The application generation device 101 includes the following functional modules.

A definition information acquisition module 301 is a functional module configured to acquire definition information for generating an application.

A connection information acquisition module 302 is a functional module configured to acquire connection information for connecting to a cloud environment.

An instruction reception module 303 is a functional module configured to receive an instruction from the user.

A generation module 304 is a functional module configured to generate an application based on the definition information acquired by the definition information acquisition module 301 in response to the instruction received by the instruction reception module 303.

A deployment module 305 is a functional module configured to deploy the application generated by the generation module 304 in the cloud environment by using the connection information acquired by the connection information acquisition module 302.

A deployment setting reception module 306 is a functional module configured to receive the setting of whether the application generated by the generation module 304 is to be deployed in the cloud environment.

The deployment module 305 is a functional module configured to deploy the application generated by the generation module 304 in the cloud environment when the deployment setting reception module 306 has set deployment of the application in the cloud environment, or prevent the application generated by the generation module 304 from being deployed in the cloud environment when the deployment setting reception module 306 has set prevention of deployment of the application in the cloud environment.

The generation module 304 is a functional module configured to generate an application based on the definition information acquired by the definition information acquisition module 301.

The deployment module 305 is a functional module configured to deploy the application generated by the generation module 304 in the cloud environment by using the connection information acquired by the connection information acquisition module 302 in response to the instruction received by the instruction reception module 303.

The connection information acquisition module 302 is a functional module configured to acquire connection information associated with identification information on the application generated by the generation module 304.

A screen display module 307 is a functional module configured to display, when the connection information acquired by the connection information acquisition module 302 has a deficiency or when connection to the cloud environment has failed even through use of the connection information acquired by the connection information acquisition module 302, a screen for registering or correcting the connection information.

This concludes the description of FIG. 3.

Figure 4:
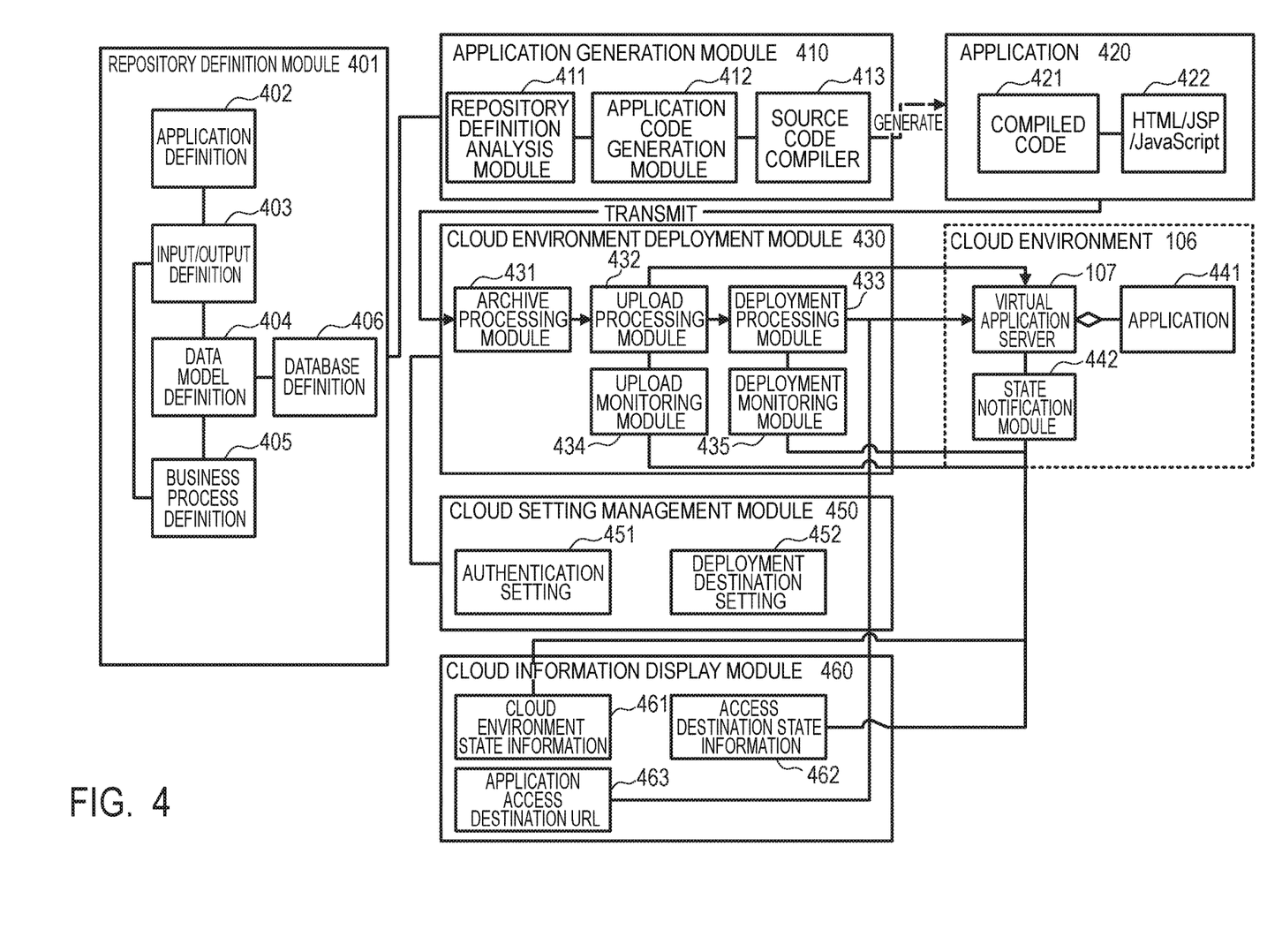
FIG. 4 is a configuration diagram for illustrating an application generation device 101, an application server 102, and an application client 104.

FIG. 4 is a configuration diagram for illustrating the application generation device 101, the application server 102, and the application client 104.

The application generation device 101 includes a repository definition module 401 and an application generation module 410.

The application generation module 410 of the application generation device 101 generates an application by using each piece of definition information of the repository definition module 401, which is set by a developer who has developed the application.

The repository definition module 401 stores an application definition 402, an input/output definition 403, a data model definition 404, a business process definition 405, and a database definition 406. Those definitions 402 to 406 are input for setting or deployed by the developer via an application development tool.

The input/output definition 403 holds definition information on a layout of items to be arranged in an application screen. The input/output definition 403 contains input item definition information and output item definition information. The input item definition information is information that defines an input item to be input by an end user of a generated application via a screen of the application. The output item definition information is information that defines an output item to be output to the screen of the generated application. The "input item definition information" and the "output item definition information" are hereinafter collectively referred to as "input/output item definition information".

In this embodiment, "the input item definition information is information that defines an input item to be input by an end user of a generated application via a screen of the application" and "the output item definition information is information that defines an output item to be output to the screen of the generated application". However, those pieces of information are not limited thereto. For example, as in the case of a batch program, which does not include a screen, or a web service, "the input item definition information may be information that defines an input item to be input to a generated application" or "the output item definition information may be information that defines an output item to be output by a generated application".

The data model definition 404 holds definition information on table items of the database. Each item of the input/output definition 403 can be associated with an item of the data model definition 404.

The business process definition 405 holds definition information on a logic for processing data on an application.

The database definition 406 defines information (e.g., IP address, authenticated user, or authentication password of database server 103) on a database to be connected by an application.

The application generation module 410 uses a repository definition analysis module 411 for generating an application to analyze each definition stored in the repository definition module 401, and generates an application including a compiled Java (trademark) code 421 and HTML/JSP/JavaScript (trademark) codes 422 via an application code generation module 412 and a source code compiler 413. That is, the application generation module 410 is an example of a module configured to generate a program to be used as an application through use of the set definition.

Figure 5:
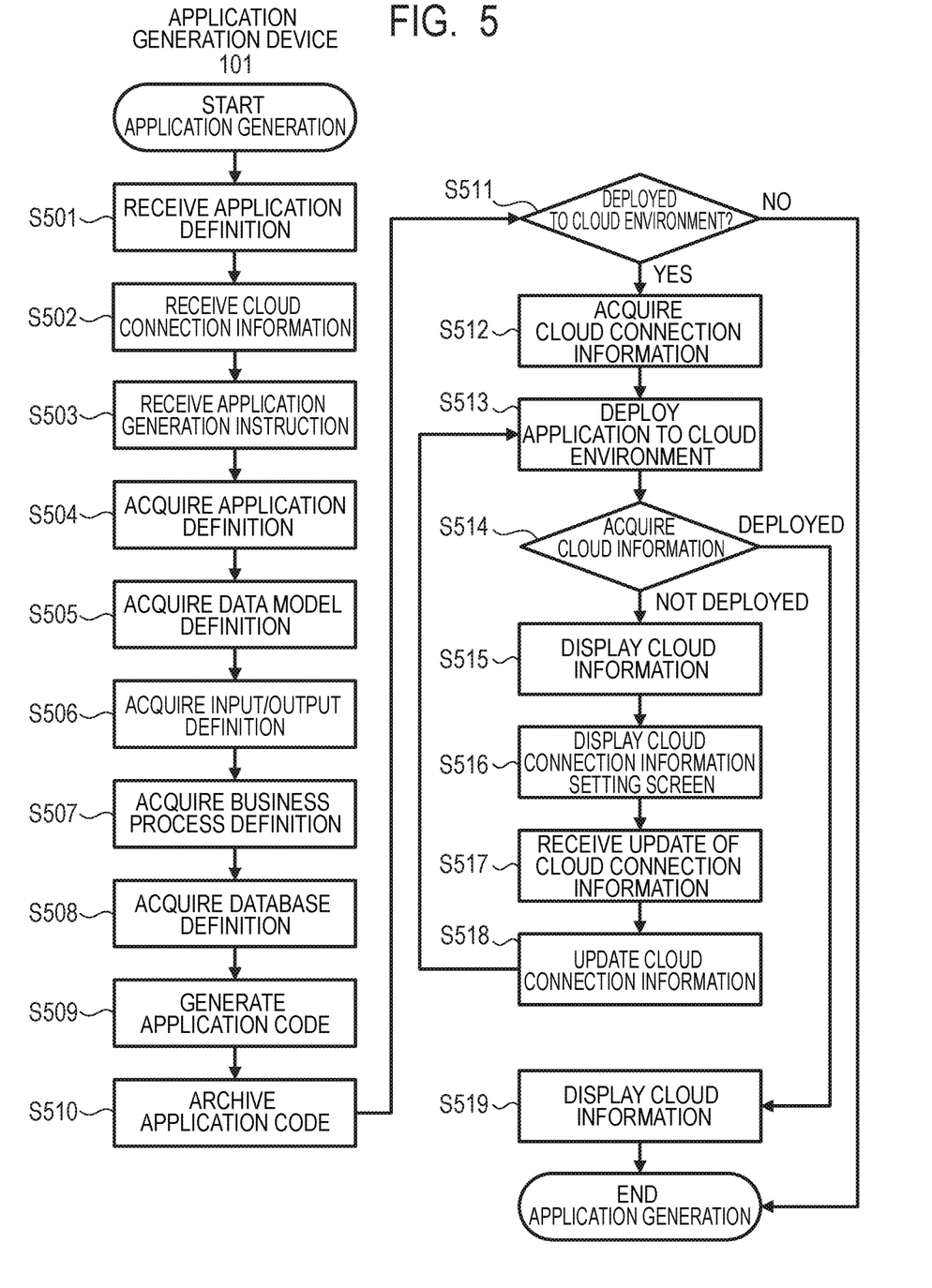
FIG. 5 is an exemplary flowchart for illustrating generation of an application.

A cloud environment deployment module 430, a cloud setting management module 450, and a cloud information display module 460 are described in each processing of the flowchart of FIG. 5.

This concludes the description of FIG. 4.

FIG. 5 is an exemplary flowchart for illustrating generation of an application.

In Step S501, the CPU 201 of the application generation device 101 receives the setting of the application definition 402. Specifically, the CPU 201 receives the settings of the input/output definition 403, the data model definition 404, the business process definition 405, and the database definition 406 from an application developer via the screen of the application development tool.

In Step S502, the CPU 201 of the application generation device 101 displays a cloud connection information setting screen 600 (FIG. 6), and receives the setting of cloud connection information. The cloud connection information is information such as an authentication setting 451 (access key 601 and secret key 602) required for connecting to the cloud environment and a deployment destination setting 452 (region 603, application name 604, and environment name 606) for determining a deployment destination of an application. The external memory 211 stores the received setting as the authentication setting 451 and the deployment destination setting 452. A "select" button 605 or a "display version history" button 608 can be pressed to select identification information on an application managed by an application development tool or identification information on a version of an application managed by the application development tool. The identification information on a version of an application is stored into the application development tool or an external memory of the client environment 106 (e.g., virtual application server 107) when the application is deployed to the cloud environment in Step S513, and in Step S502, the application development tool acquires, from the external memory, the history of identification information on a version of an application deployed to the cloud environment in response to reception of depressing the "display version history" button 608, and displays the history so that a version can be selected from the history. That is, Step S502 is a step of an example of processing of acquiring the history information relating to an application. Further, Step S513 is a step of an example of processing of connecting to the cloud environment using the acquired connection information and deploying the generated application in the cloud environment based on the history information on the acquired application. With this, it is possible to easily deploy an application of a version that was deployed in the past again. Further, the connection information is an example of information containing at least one of identification information on the cloud environment or a connection key for connecting to the cloud environment.

Figure 6:
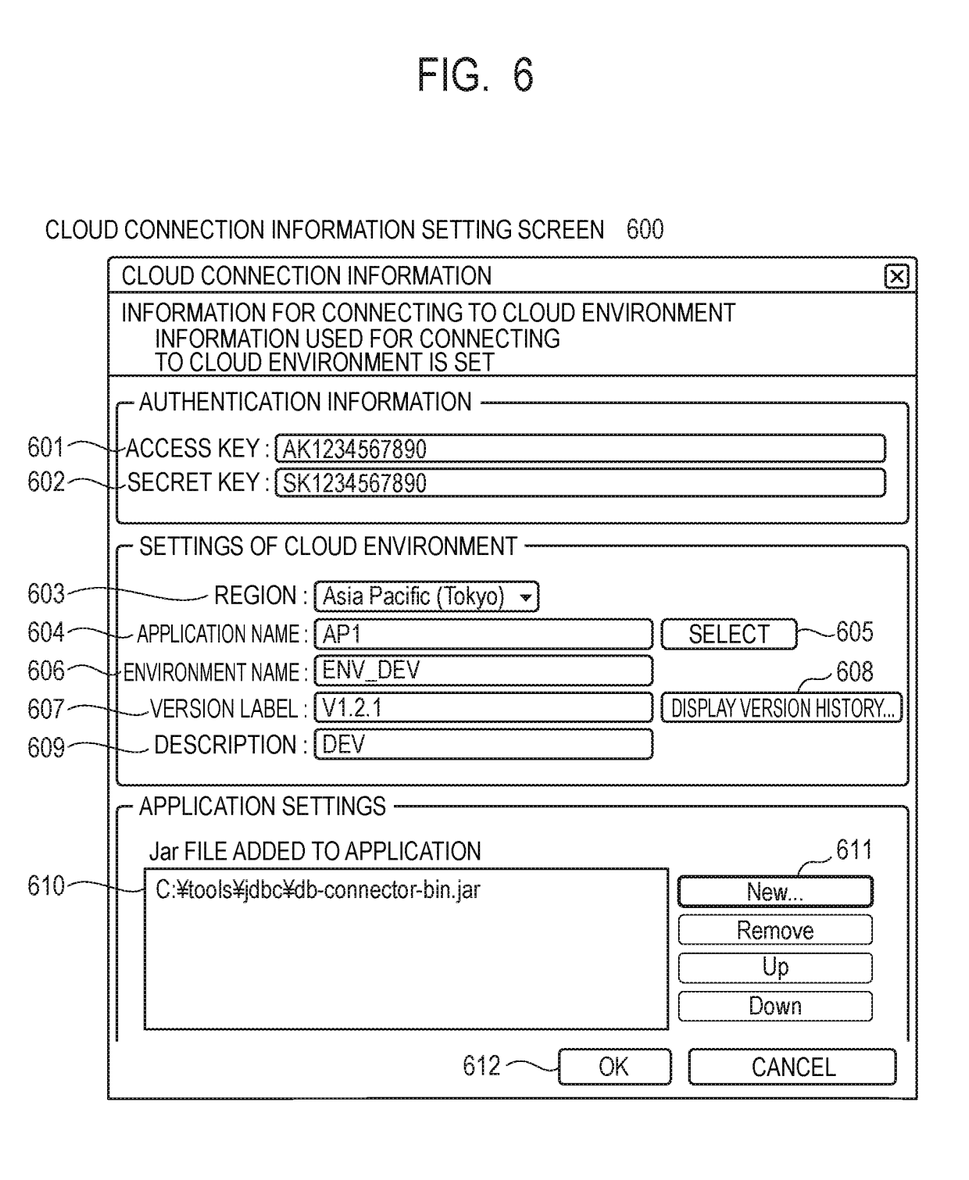
FIG. 6 is an exemplary image for showing a cloud connection information setting screen 600.

Further, the cloud connection information setting screen 600 receives the setting of, for example, an application setting (version label 607, description 609, or JAR file 610 to be added to application).

It is assumed that the authentication setting 451 of the cloud connection information setting screen 600 can be set for each piece of identification information on an application to be generated by the application generation tool. That is, the authentication setting 451 is an example of information associated with identification information on an application to be generated. The cloud connection information setting screen 600 can be set for each piece of identification information on an application so that it is possible to provide a system in which even a developer who develops a plurality of applications having pieces of identification information indicating different deployment cloud environments can easily deploy the generated application in the cloud environment. In this embodiment, the authentication setting 451 can be set for each piece of identification information on an application. However, the configuration is not limited thereto. The authentication setting 451 can be configured to be set for each application generation tool (namely, application generation device 101).

In Step S503, the CPU 201 of the application generation device 101 displays the application generation screen 700 (FIG. 7), and receives an instruction to generate an application through pressing of an "OK" button 702. That is, Step S503 is a step of an example of processing of receiving an instruction from the user.

Figure 7:
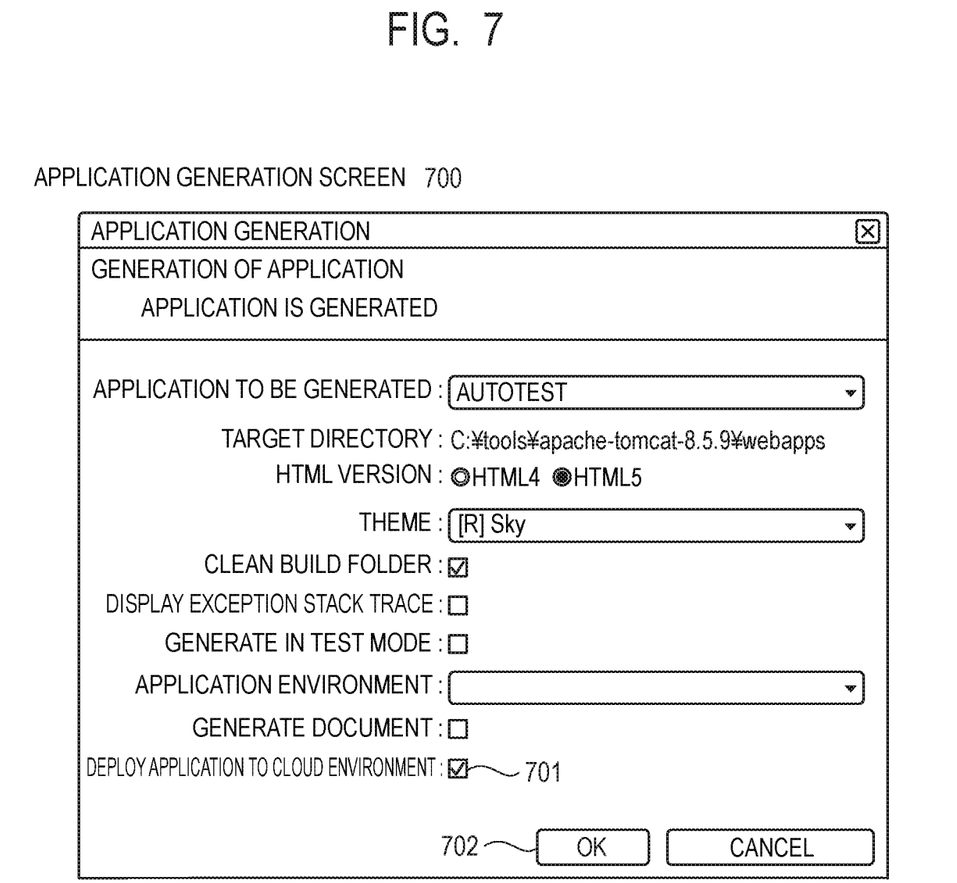
FIG. 7 is an exemplary image for showing an application generation screen 700.

In this embodiment, pressing of the "OK" button 702 indicates an instruction to generate an application. However, the configuration is not limited thereto. For example, storing, changing, or committing of the application definition 402, the input/output definition 403, the data model definition 404, the business process definition 405, the database definition 406, and a source file may indicate an instruction to generate an application. Further, a trigger by, for example, a batch program or a scheduler may indicate an instruction to generate an application. That is, Step S503 is a step of an example of processing of detecting an instruction that is based on one of a user operation, a batch program, a scheduler, and registration or update of definition information.

When a check box 701 indicating deployment to the cloud environment is checked, after an application is generated, the generated application is deployed to the cloud environment (details thereof are described in Step S511 to Step S513 later). That is, Step S503 is a step of an example of processing of receiving the setting of whether the generated application is to be deployed to the cloud environment. Further, Step S503 is a step of an example of processing of acquiring the setting of whether the generated application is to be deployed in the cloud environment.

In this embodiment, an instruction to generate an application is received in Step S503 after the setting of the cloud connection information is received in Step S502. However, the configuration is not limited to this order, and the setting of the cloud connection information may be received after an instruction to generate an application is received and deployed to the cloud environment in Step S503.

In Step S504, the CPU 201 of the application generation device 101 receives the application definition 402 from the repository definition module 401. The repository definition analysis module 411 analyzes and stores the acquired definition into the memory, and the analyzed definition is appropriately referred to in each processing of generating an application.

In Step S505, the CPU 201 of the application generation device 101 acquires the data model definition 404 from the repository definition module 401.

In Step S506, the CPU 201 of the application generation device 101 acquires the input/output definition 403 from the repository definition module 401.

In Step S507, the CPU 201 of the application generation device 101 acquires the business process definition 405 from the repository definition module 401.

In Step S508, the CPU 201 of the application generation device 101 acquires the database definition 406 from the repository definition module 401. That is, Step S504 to Step S508 are steps of an example of processing of acquiring definition information for generating an application.

In Step S509, the CPU 201 of the application generation device 101 uses the application code generation module 412 to generate and compile an application code (program) to be used for execution of the application. That is, Step S509 is a step of an example of processing of generating an application based on the acquired definition information in response to the received instruction. Further, Step S509 is a step of an example of processing of generating an application based on the acquired definition information.

The application code to be generated in Step S509 is, for example, a Java (trademark) code, a JSP (trademark) code, a stylesheet, an HTML code, an XML code, a batch file, a resource file, or various configuration files. Those programs are executed by the application server 102 to operate the application.

In Step S510, the CPU 201 of the application generation device 101 archives an application code generated in Step S509. Specifically, the archive processing module 431 is used to organize the application code generated in Step S509 into an archive file such as a WAR file or a JAR file.

In Step S511, the CPU 201 of the application generation device 101 determines whether to deploy the application to the cloud environment. Specifically, the CPU 201 of the application generation device 101 determines whether the check box 701 indicating deployment to the cloud environment on the application generation screen 700 (FIG. 7), which is received in Step S503, is checked. When the application is to be deployed to the cloud environment, the processing proceeds to Step S512, whereas when the application is not to be deployed to the cloud environment, the CPU 201 ends the processing of this flowchart.

That is, Step S511 is a step of an example of processing of deploying the generated application in the cloud environment when the application is set to be deployed in the cloud environment, whereas Step S511 is a step of an example of processing of preventing the generated application from being deployed in the cloud environment when the application is set not to be deployed in the cloud environment. Further, Step S511 is a step of an example of processing of controlling whether the generated application is to be deployed in the cloud environment based on the acquired setting.

In Step S512, the CPU 201 of the application generation device 101 acquires the cloud connection information received in Step S502 from the external memory 211. That is, Step S512 is a step of an example of processing of acquiring connection information for connecting to the cloud environment. Further, Step S512 is a step of an example of processing of acquiring connection information to be used for connecting to the cloud environment.

Further, when the authentication setting 451 of the cloud connection information setting screen 600 is set for each piece of identification information on an application to be generated by the application generation tool, the identification information on an application for which a generation instruction is received in Step S503 is used to acquire the cloud connection information corresponding to the application. That is, Step S512 is a step of an example of processing of acquiring connection information associated with the identification information on the generated application.

In Step S513, the CPU 201 of the application generation device 101 connects to the cloud environment by using the authentication setting 451 of the cloud connection information acquired in Step S512, and uses the deployment destination setting 452, a upload processing module 432, a deployment processing module 433 of the cloud connection information acquired in Step S512 to deploy the application archived in Step S509 in the virtual application server 107. After the application is deployed, the CPU 201 of the virtual application server 107 starts the deployed application for an application 441 to get ready for operation.

That is, Step S513 is a step of an example of processing of deploying the generated application in the cloud environment by using the acquired connection information. Further, Step S513 is a step of an example of processing of deploying the generated application in the cloud environment by using the acquired connection information in response to the received instruction. Further, Step S513 is a step of an example of processing of deploying the generated application in the cloud environment in response to detection.

Figure 9:
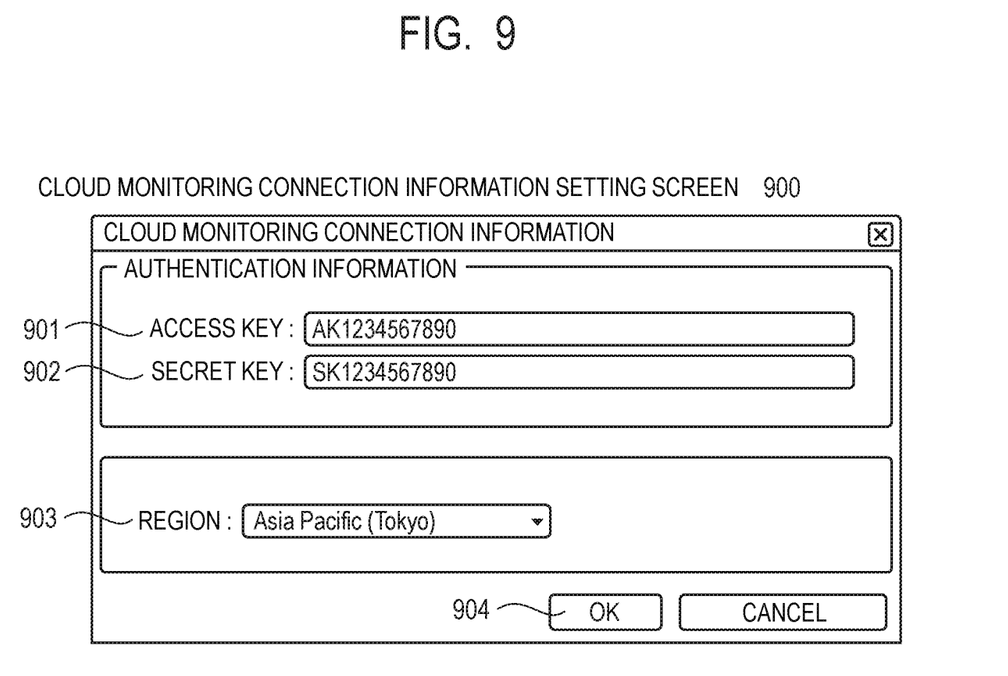
FIG. 9 is an exemplary image for showing a cloud monitoring connection information setting screen 900.

In Step S514, the CPU 201 of the application generation device 101 acquires the cloud information. Specifically, an upload monitoring module 434 and a deployment monitoring module 435 are used to acquire information on whether the deployment processing in Step S513 has been finished normally. Further, connection information for monitoring the cloud environment, which is set in advance on a screen, for example, a cloud monitoring connection information setting screen 900 (FIG. 9), is used to access the virtual application server 107, and information such as cloud environment state information 461 ("state") and access destination state information 462 ("health") is acquired via a state notification module 442.

The "state" represents whether the relevant cloud environment is active (e.g., "Ready"), and the "health" represents whether the deployed application can receive access (e.g., "Green"). The CPU 201 of the application generation device 101 uses those values to determine whether the application has been deployed normally in Step S513, and proceeds to Step S519 when it is determined that the application has successfully been deployed, or proceeds to Step S515 when it is determined that the application has failed to be deployed.

In Step S515, the CPU 201 of the application generation device 101 displays the cloud information acquired in Step S514. Specifically, the CPU 201 of the application generation device 101 displays a screen, for example, the cloud information screen 800 (FIG. 8), and displays the state of the cloud environment or information on the health. The cloud information screen 800 displays items such as "application name", "environment name", "URL (application access destination URL 463)", "state", "health", "version label", "creation date and time", and "update date and time".

Figure 8:
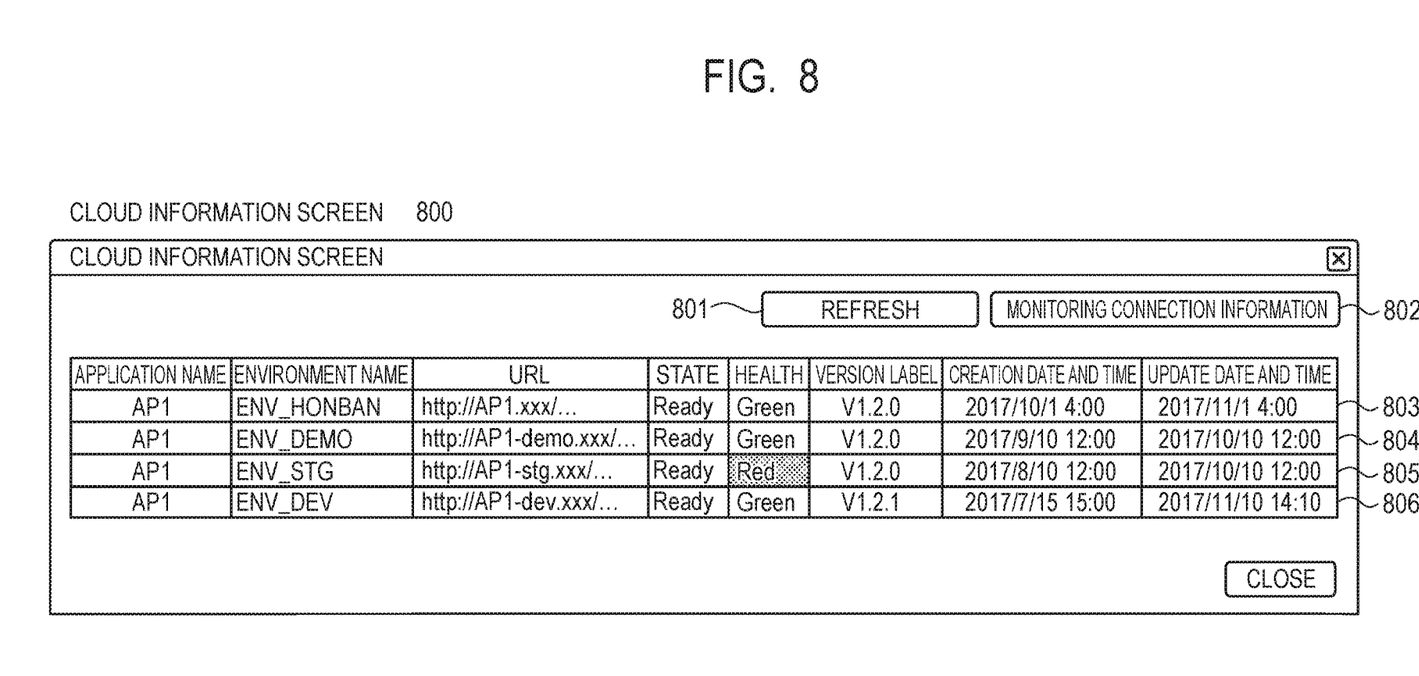
FIG. 8 is an exemplary image for showing a cloud information screen 800.

Further, when a "refresh" button 801 is pressed, Step S514 is executed again, and the latest cloud information is acquired. Further, when a "monitoring connection information" button 802 is pressed, a screen, for example, the cloud monitoring connection information setting screen 900 (FIG. 9), is displayed, and connection information for monitoring the cloud environment, which has been set or not set in advance, can be registered or updated.

In Step S516, the CPU 201 of the application generation device 101 displays the cloud connection information setting screen 600 (FIG. 6). That is, Step S516 is a step of an example of processing of displaying, when stored connection information has a deficiency or connection to the cloud environment has failed even through use of the stored connection information, a screen for registering or correcting the connection information. As a result, for example, when the stored connection information has a deficiency, the stored connection information cannot be used to connect to the cloud environment, the cloud environment cannot be used, or the deployed application cannot be accessed, the cloud connection information setting screen 600 is displayed, and thus it is possible to immediately set the connection information again to deploy the application again.

In Step S517, the CPU 201 of the application generation device 101 receives the setting of the cloud connection information via the cloud connection information setting screen 600. This processing is similar to Step S502.

In Step S518, the CPU 201 of the application generation device 101 stores the setting received in Step S517 into the external memory 211 as the authentication setting 451 and the deployment destination setting 452, and returns to Step S513.

In Step S519, the CPU 201 of the application generation device 101 displays the cloud information acquired in Step S514. This processing is similar to Step S515.

This concludes the description of FIG. 5.

In this manner, it is possible to perform processing of, for example, generating, archiving, and deploying an application to the cloud environment by one instruction. Therefore, it is possible to solve a problem in that it takes time and effort to generate and arrange an application, and it is thus possible to provide a system for easily deploying the generated application to the cloud environment.

Figure 10:
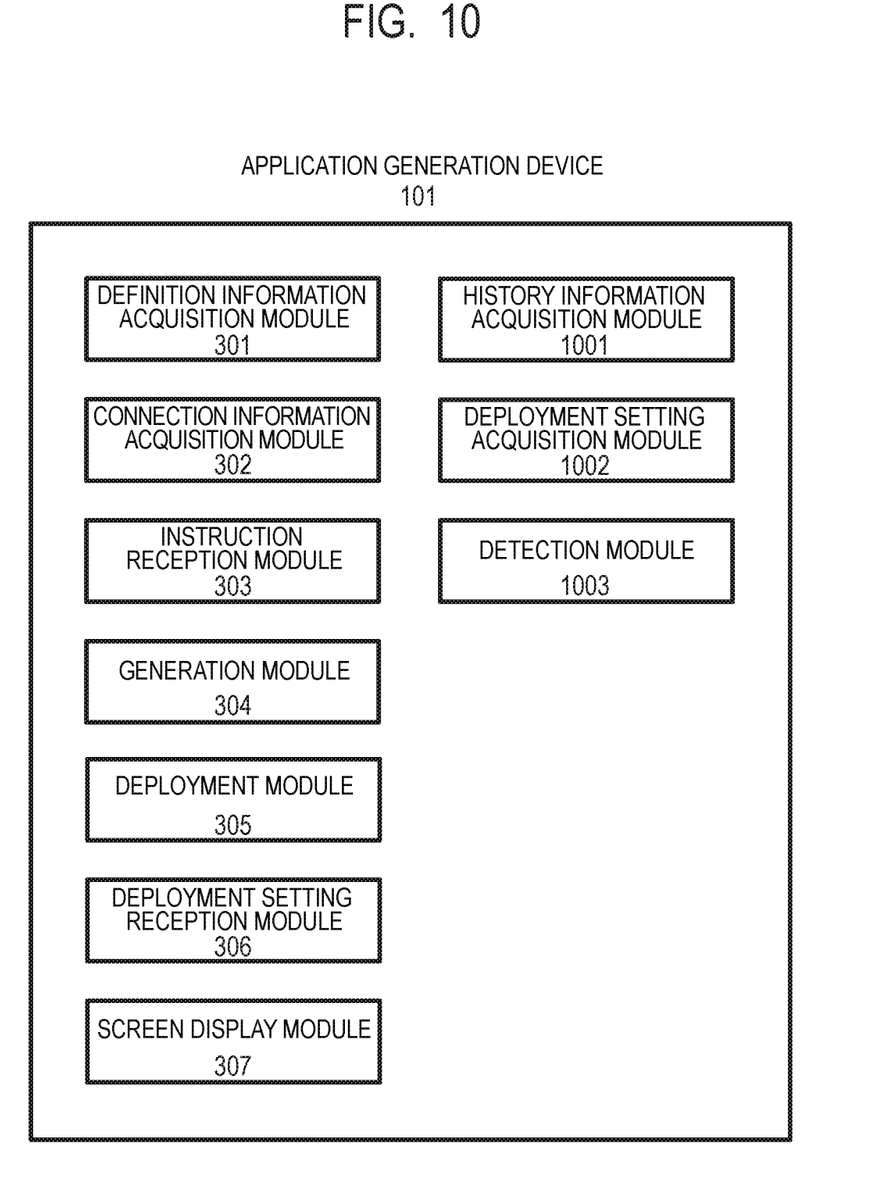
FIG. 10 is an exemplary diagram of details of the block diagram of FIG. 3.

FIG. 10 is an example of details of the block diagram of FIG. 3. A description duplicate with the description of FIG. 3 is omitted.

The connection information acquisition module 302 is a functional module configured to acquire the connection information to be used for connecting to the cloud environment.

A history information acquisition module 1001 is a functional module configured to acquire history information on an application.

The deployment module 305 is a functional module configured to connect to the cloud environment by using the connection information acquired by the connection information acquisition module 302, and deploy the application generated by the generation module 304 in the cloud environment based on history information on the application acquired by the history information acquisition module 1001.

A deployment setting acquisition module 1002 is a functional module configured to acquire the setting of whether the application generated by the generation module 304 is to be arranged in the cloud environment.

The deployment module 305 is a functional module configured to control whether the application generated by the generation module 304 is to be arranged in the cloud environment based on the setting acquired by the deployment setting acquisition module 1002.

A detection module 1003 is a functional module configured to detect one of a user operation, an instruction based on a batch program or a scheduler, and registration or update of the definition information.

The deployment module 305 is a functional module configured to deploy the application generated by the generation module 304 to the cloud environment in response to detection by the detection module 1003.

This concludes the description of FIG. 10.

Figure 11:
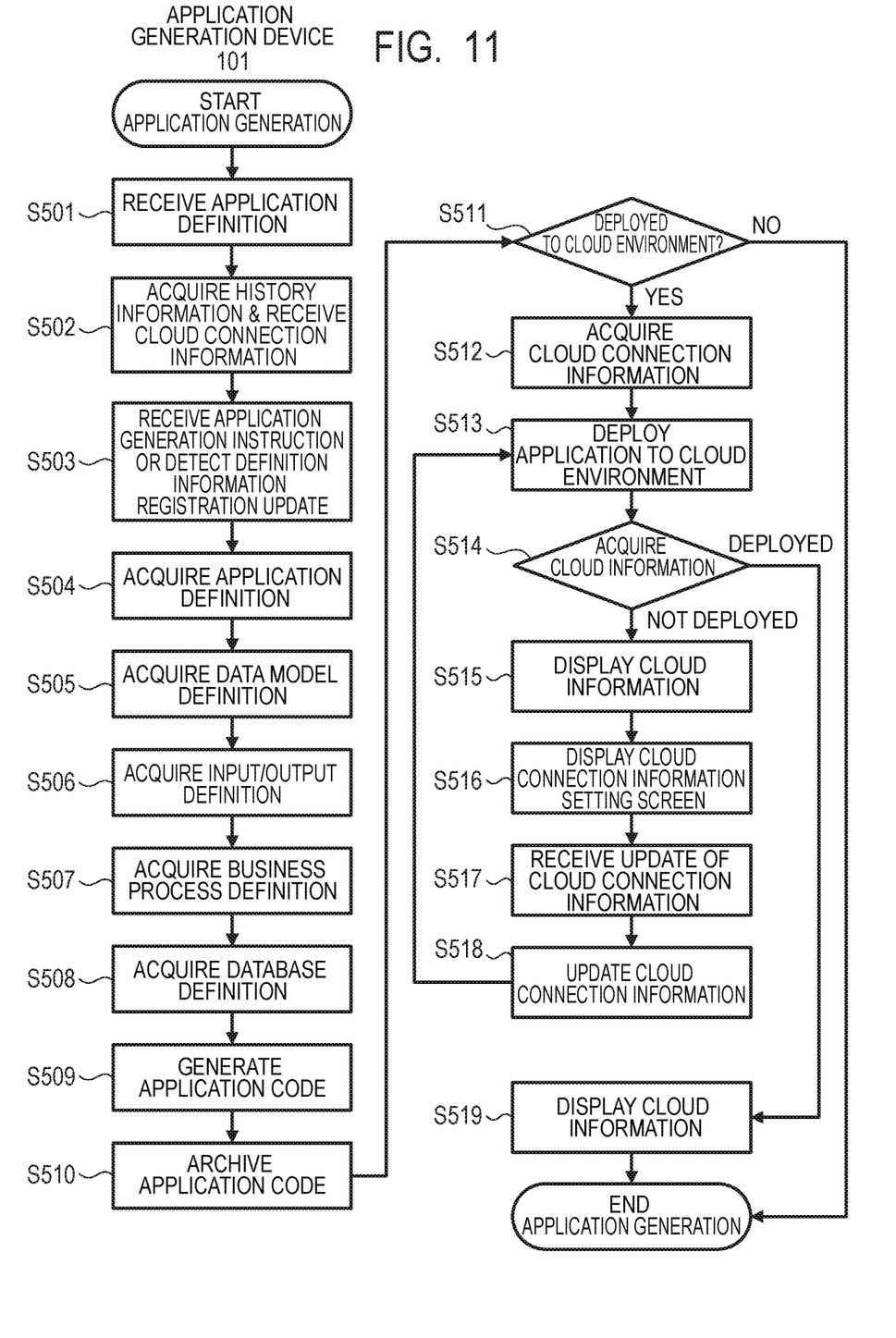
FIG. 11 is an exemplary flowchart of details of the flowchart of FIG. 5.

Further, FIG. 11 is an example of details of the flowchart of FIG. 5. That is, Step S502 and Step S503 of FIG. 11 are not different from the processing performed in Step S502 and Step S503 of FIG. 5, but are represented more in detail. Other steps, namely, Step S501 and Step S504 to Step S519, are the same as those of FIG. 5. This concludes the description of FIG. 11.

As described above, it is to be understood that the object of the present invention is also achieved by supplying a non-transitory computer-readable storage medium having stored thereon a program for implementing the function of the above-mentioned embodiment to a system or an apparatus, and reading, by a computer (or CPU or MPU) of the system or the apparatus, the program stored in the non-transitory computer-readable storage medium for execution.

In this case, the program itself read out from the recording medium implements the novel function of the present invention, and the recording medium having the program stored thereon constitutes the present invention.

As the recording medium for supplying the program, it is possible to use, for example, a flexible disk, a hard disk drive, an optical disc, an optomagnetic disk, a CD-ROM, a CD-R, a DVD-ROM a magnetic tape, a non-volatile memory card, a ROM, an EEPROM, or a silicon disk.

In addition, it is to be understood that the present invention encompasses not only the case in which the above-mentioned function of the embodiment is implemented when the read program is executed but also the case in which, based on an instruction of the program, an operating system (OS) or the like running on the computer performs a part or a whole of the actual process to implement the above-mentioned function of the embodiment.

Further, it is to be understood that the present invention also encompasses the case in which the program read out from the recording medium is written in a memory of a function extension board inserted in the computer or a function extension unit connected to the computer, and then, based on an instruction of the program code, a CPU or the like of the function extension board or the function extension unit performs a part or a whole of the actual process to implement the above-mentioned function of the embodiment.

In addition, the present invention may be applied to a system including a plurality of devices or to an apparatus including a single device. In addition, it is to be understood that the present invention can also support the case in which the above-mentioned function is implemented by supplying the program to a system or an apparatus. In this case, the recording medium having stored thereon the program for implementing the present invention is read out by the system or the apparatus so that the system or the apparatus can obtain the effect of the present invention.

The program may be in a format of, for example, an object code, a program code to be executed by an interpreter, or script data to be supplied to an operating system (OS).

Further, by downloading and reading out the program for implementing the present invention from a server, a database, or the like on the network by using a communication program, the system or the apparatus can obtain the effect of the present invention. Configurations obtained by combining the above-mentioned embodiment and modification examples thereof are all encompassed in the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-218003, filed Nov. 13, 2017, and Japanese Patent Application No. 2018-173189, filed Sep. 18, 2018 which are hereby incorporated by reference herein in their entirety.

What is claimed is:

1. A non-transitory computer-readable storage medium containing program which is executable by an information processing device configured to generate an application, the program causing the information processing device to function as:
   a definition information acquisition module configured to acquire definition information for generating the application;
   a generation module configured to generate the application based on the definition information acquired by the definition information acquisition module;
   a connection information acquisition module configured to acquire connection information to be used for connecting to a cloud environment;
   a deployment module configured to deploy, in the cloud environment, the application generated by the generation module based on the connection information acquired by the connection information acquisition module;
   a history information acquisition module configured to acquire multiple versions of the application deployed by the deployment module; and
   a redeployment module configured to redeploy, in the cloud environment, one version of the application selected from the multiple versions of the application acquired by the history information acquisition module based on the connection information acquired by the connection information acquisition module.

2. The non-transitory computer-readable storage medium according to claim 1, wherein the connection information includes:
   identification information on the application generated by the generation module; and
   environment information on the application,
   wherein the redeployment module is further configured to redeploy, in the cloud environment, the selected version of the application for each environment included in the environment information.

3. The non-transitory computer-readable storage medium according to claim 2, the program further causing the information processing device to function as a display module configured to display, in a display unit, a list of versions of the application deployed by the deployment module or the redeployment module for each environment included in the environment information.

4. The non-transitory computer-readable storage medium according to claim 1, the program further causing the information processing device to function as a deployment setting acquisition module configured to acquire a setting of whether the application generated by the generation module is to be deployed in the cloud environment,
   wherein the deployment module is configured to control whether the application generated by the generation module is to be deployed in the cloud environment based on the setting acquired by the deployment setting acquisition module.

5. The non-transitory computer-readable storage medium according to claim 1, the program further causing the information processing device to function as a detection module configured to detect one of a user operation, an instruction based on a batch program or a scheduler, and registration or update of the definition information,
wherein the deployment module is configured to deploy the application generated by the generation module in the cloud environment in response to the detection by the detection module.

6. The non-transitory computer-readable storage medium according to claim 1, the program further causing the information processing device to function as a screen display module configured to display, when the connection information acquired by the connection information acquisition module has a deficiency or connection to the cloud environment has failed even through use of the connection information, a screen for performing one of registration and correction of the connection information.

7. The non-transitory computer-readable storage medium according to claim 1, wherein the connection information contains at least one of identification information on the cloud environment or a connection key for connecting to the cloud environment.

8. An information processing device, which is configured to generate an application, the information processing device comprising:
a definition information acquisition module configured to acquire definition information for generating the application;
a generation module configured to generate the application based on the definition information acquired by the definition information acquisition module;
a connection information acquisition module configured to acquire connection information to be used for connecting to a cloud environment;
a deployment module configured to deploy, in the cloud environment, the application generated by the generation module based on the connection information acquired by the connection information acquisition module;
a history information acquisition module configured to acquire multiple versions of the application deployed by the deployment module; and
a redeployment module configured to redeploy, in the cloud environment, one version of the application selected from the multiple versions of the application acquired by the history information acquisition module based on the connection information acquired by the connection information acquisition module.

9. A processing method, which is executed in an information processing device configured to generate an application, the processing method comprising:
acquiring definition information for generating the application;
generating the application based on the definition information acquired in the acquiring of the definition information;
acquiring connection information to be used for connecting to a cloud environment;
deploying, in the cloud environment, the application generated by the generating of the application based on the connection information acquired by the acquiring of the connection information;
acquiring multiple versions of the application deployed by the deploying; and
redeploying, in the cloud environment, one version of the application selected from the multiple versions of the application acquired in the acquiring of the multiple versions of the application based on the connection information acquired by the acquiring of the connection information.

* * * * *